3,308,020
COMPOSITIONS AND METHOD FOR BINDING BILE ACIDS IN VIVO INCLUDING HYPOCHOLESTEREMICS
Frank J. Wolf, Westfield, N.J., and David M. Tennent, Ashland, Ohio, assignors to Merck & Co., Inc., Rahway, N.J., a corporation of New Jersey
No Drawing. Filed Sept. 22, 1961, Ser. No. 139,880
18 Claims. (Cl. 167—65)

This application is a continuation-in-part of our application Serial No. 40,156, filed July 1, 1960 which was a continuation-in-part of Serial No. 748,598 filed July 15, 1958, both now abandoned.

This invention relates to methods and compositions for binding bile acids in the intestinal tract into unabsorbable forms, a process which has the effect of reducing blood cholesterol and relieving pruritis due to bile stasis.

We have discovered that bile acids can be effectively bound in the intestinal tract, and thus placed in a condition to be excreted in a biochemically and physiologically inert (i.e., an unabsorbable) condition, by the oral administration of non-toxic water-soluble polymeric amines having a molecular weight greater than 1500, having sufficient ionizable amino groups that the equivalent weight is less than 500, having a polymer skeleton inert to digestive enzymes, and having the power to prevent the dialysis of at least 80% of an equal weight of glycocholic acid through a cellophane membrane.

Heart disease has been the leading cause of death in the United States in recent years. Atherosclerosis is one of the most significant forms of cardiovascular disease because of its frequent occurrence and its predilection for serious ailments such as coronary thrombosis. Atherosclerosis is characterized by thickening of intima, reduction in diameter, and loss of elasticity of arteries, due to fatty accumulations. Higher blood levels of cholesterol are observed in atherosclerosis patients than in normal persons. Accordingly, it is considered important in the treatment and prevention of atherosclerosis to maintain normal blood cholesterol levels.

The common atherosclerosis therapy up to the present time has been a low fat diet, devoid as far as possible of animal fats. This necessitates reduced consumption of nutritious foods such as meat, milk, and eggs. It is evident that a more desirable therapy would be to permit the patient to have a normal diet and to maintain the cholesterol blood level where desired by control with a therapeutic agent. However, prior to the present invention, no therapeutic agents for maintaining desired blood levels of cholesterol which are both safe and effective have been found.

As a result of the present invention, it has been found that blood levels of cholesterol can be maintained at a desired level by the oral administration of non-toxic glycocholic acid-binding polymeric amines (1) having a molecular weight in excess of 1500, and (2) having ionizable amino groups in sufficient number that the equivalent weight based on said amino groups is less than 500, and (3) having a polymeric skeleton inert to degradation by digestive enzymes. Particularly desirable are the non-toxic quaternary ammonium salts which are included within the term, "polymeric amine" for the purposes of this invention.

Pruritis, or severe itching, especially at the anus, is a major complaint of persons suffering from interference with normal excretion of bile, as in biliary cirrhosis or other forms of bile stasis. This can be so severe that patients are known to contemplate suicide. Until recently, the control of such pruritis has been unsatisfactory, being principally surgical biliary drainage.

When the bile acids in the gut are bound by the method of this invention, dramatic reduction of the itching associated with bile stasis occurs. Further, there is no rise in serum bilirubin nor any adverse effect of this treatment on liver function as measured by standard tests. The morale of patients is strikingly enhanced. The treatment, however, is not effective if the cause of biliary stasis is a block of the bile duct.

Ability to immobilize glycocholic acid in aqueous solutions in vitro is an essential characteristic of the polymers useful in the present invention which correlates with the in vivo binding of bile acids. All polymers which have been found effective for sequestering bile acids in vivo are capable of immobilizing at least 80% glycocholic acid when added to an equal weight of said acid in aqueous solution and dialyzed through a cellophane membrane, as described below. Polymers which do not immobilize glycocholic acid in aqueous solution to this extent are ineffective in cholesterol blood level reduction. Bile acids are immobilized or bound in our invention either by sequestration in solution or by forming water insoluble precipitates.

The surprising correlation between glycocholic acid-binding power in vitro, binding of bile acids, in vivo, and the ability to reduce cholesterol blood levels in man and other animals apparently can be explained by the fact that the system maintains a substantially constant bile acid level in spite of the administration of a material which effectively removes bile acids from the system. Administration of a polymer according to this invention probably prevents bile acid reabsorption in vivo. Cholesterol is oxidized to bile acids so as to maintain a substantially constant bile acid level, resulting in a lowered cholesterol blood level. This is considered the most probable explanation of the action of polymers administered according to this invention, although we do not wish to be bound by any theory by way of explanation.

Why the binding of bile acids in the gut should prove to be such a competent answer to pruritis is not completely understood since attempts to correlate the presence of pruritis with the degree of retention of bile acids in the gut has given equivocable results in the past. A rough correlation exists, however, between serum bile acid levels and the presence or absence of pruritis.

The water soluble polymers which will successfully bind bile acids have certain very definite characteristics which serve to delineate those which are operative. They must have a molecular weight greater than 1500, although polymers having a molecular weight above 3000 are preferred as cholesterol blood level reducing agents. Such materials are not absorbed in the alimentary tract and, therefore, do not cause toxic effects. The polymers must have a plurality of ionizable amines (i.e., either quaternary amino groups, which are already ions, or amino groups sufficiently basic to form acid addition salts) in contrast to pseudoamino groups such as amide nitrogen. Further, these amino groups must be sufficiently numerous in the polymer chain to make the equivalent weight based on titration of the amino groups less than 500. Finally, the polymer skeleton (i.e., the fundamental atom chain of the polymer) must be inert to degradation by digestive enzymes. Since the latter act principally by hydrolysis, this means that the polymer must be free of easily hydrolyzed amide, ester, and the like, linkages. Above all, they must meet the in vitro test of binding at least 80% of glycocholic acid, as described below.

Various polymeric substances have been found to be useful according to the present invention. One such polymer, variously known as "Acryloid CQ" and "Acrysol CQ," a linear acrylic type quaternary ammonium salt polymer having a molecular weight on the order of about 2,000,000, made by Rohm and Haas Company, Philadelphia, Pa., is quite useful in reducing cholesterol blood levels. This polymer, structurally a straight carbon skeleton with ester side chains, the esters being from quaternary ammonium substituted alcohols, is soluble in water, and the water solution has a viscosity of 2500 to 5000 centipoises in 5% aqueous solution at room temperature and available from the manufacturer in an aqueous solution containing about 12 to 14 percent by weight of polymer. It has an equivalent weight, based on the ammonium groups, of about 350–360.

Another polymer which is effective according to the present invention is "Acrysol CA," a soluble tertiary amine salt available from Rohm and Haas Company. Aside from the fact that this polymer is a tertiary amine salt rather than a quaternary ammonium salt, its properties in general are the same as those of Acrysol CQ. Its equivalent weight is of the order of 325.

A third water-soluble polymer which has been found quite effective in cholesterol therapy according to this invention is polyethyleneimine, which has the structure

and an average molecular weight of about 30,000. This polymer is available from the Borden Company, New York, N.Y. It has a very low equivalent weight, of the order of about 43, since each imine group is an active ionizable amine.

Still another water-soluble polymer useful in cholesterol blood level reduction is "Separan CR70," made by the Dow Chemical Co., Midland, Michigan. This material is a copolymer of acrylamide and vinyl benzyl trimethylammonium chloride in a weight ratio of about 30:70, having an equivalent weight of about 302 and an average molecular weight of above 100,000.

Another polymer which can be used in controlling the level of blood cholesterol is a polystyrene which has been chlormethylated on the aromatic rings and the chlorine reacted with a tertiary amine such as trimethylamine or dimethylaminoethanol to form a quaternary ammonium polymer of the basic unit

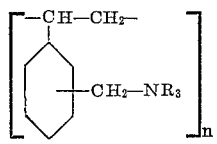

Such polymers have very high molecular weights and equivalent weight of the order of 175–200.

Similar other polymers operable in our invention are polyacrylamides and polyacrylonitriles having in the chain comonomers such as quaternary ammonium alkyl esters of acrylic acid. One such of equivalent weight about 188, was found to be quite successful in lowering blood cholesterol. Such polymers can be prepared either by actually copolymerizing such esters with the amide or nitrile, or by partial hydrolysis of the polymeric amide or nitrile and esterification of the acid groups so formed.

Other polymers are also useful for administration to reduce cholesterol blood levels as will be obvious to those skilled in the art.

The minimum effective daily dosage of the useful polymers is about 0.5 g./day in man. Because of the low toxicities of the useful polymers, extremely high dosages can be given without ill effect. From the standpoint of cholesterol serum level reduction, no advantages accrue in increasing the daily dosage above 250 g. Preferred dosages lie in the range of about one to 100 g./day.

Conventional pharmaceutical formulations of resins according to the present invention can be made. The usual pharmaceutical formulations, such as tablets, elixirs, syrups, aqueous solutions, or suspensions and the like, are suitable. The unit dosage is of a convenient size, as for example tablets from 100 mg. to 20 grams, or suspensions containing from about 100 mg. to one gram of polymer. Examples of various pharmaceutical formulations are as follows:

*Formulation 1*

An aqueous 5% solution of Acrysol CQ is made as follows:

|  | Ml. |
|---|---|
| Acrysol CQ (12.5% aqueous solution) | 40 |
| Sweetening agent (10 parts sodium cyclamate plus one part sodium saccharin) | 1 |
| Water, q.s. | 100 |

The Acrysol CQ solution is mixed with the sweetening agent. This mixture is then diluted with water to 100 ml.

The above sweetening agent is the one used in all formulations in this application where a sweetening agent is specified.

*Formulation 2*

An aqueous 5% solution of polyethyleneimine is made as follows:

|  | Ml. |
|---|---|
| Polyethyleneimine (50% aqueous solution) | 10 |
| Sweetening agent | 1 |
| Water, q.s. | 100 |

Conventional preservatives, flavoring agents and coloring matter may be added, if desired, to any of the above formulations.

The formulations for administering the resins can also be in the form of low calorie diets for treatment of hypercholesteremia in obese patients. Such compositions include various food chemicals—vitamins, minerals, fats, proteins, carbohydrates, etc.—to form a balanced diet, as well as flavoring agents and dispersing agents. For treatment of pruritis very low calorie compositions are usually used. The resins can also be incorporated in a variety of solid foods such as bread, cookies, cake, cereals, desserts, fruit dishes (e.g., applesauce) and the like. The term "orally ingestible carrier" in the claims is intended to include such materials as well as the usual pharmaceutically acceptable carriers such as capsules, tableting ingredients, syrup compositions, aqueous solutions and suspensions and the like.

Resins and polymers which are effective in reducing blood cholesterol concentration are also found to remove 80% of the glycocholic acid from aqueous solutions. Example 1 illustrates the method of testing the removal of glycocholic acid from aqueous solution by water-soluble polymers of the type described above.

EXAMPLE 1

62.5 mg. of sodium glycocholate and 62.5 mg. of acrysol CQ in 50 ml. of water were placed inside a cellophane dialysis bag. The bag was a tubular bag, 30 mm. in diameter, closed at the ends. The bag was placed in a beaker of water containing a volume equal to that inside the bag. The beaker and dialysis bag were allowed to stand for 48 hours, and the solutions inside and outside the bag were analyzed for glycocholic acid content by measurement of optical density by the following procedure: An aliquot of the solution was diluted to obtain an aliquot estimated to contain 0.1 mg. of glycocholic acid in 1 ml. To this diluted aliquot was added 4 ml. of reagent sulfuric acid prepared by diluting 42 ml. of concentrated sulfuric acid with 24 ml. of water. The resulting solution was mixed thoroughly and heated for 15 minutes at 56° C. in a constant temperature bath. After cooling to room temperature, the optical density was determined at 318 m$\mu$ using the sulfuric acid reagent blank. The optical density of the original solution was obtained by multiplying the optical density of the diluted aliquot by the volume ratio of diluted aliquot to original solution. The results are summarized in Table 1.

TABLE 1.—OPTICAL DENSITY

| Inside Bag | | Outside Bag | |
| --- | --- | --- | --- |
| Original | Final | Original | Final |
| 3.150 | 2.650 | 0 | 0.500 |

From the data in Table 1, it can be seen that 16% of the glycocholic acid was dialyzed, or 84% was bound. Using the same procedure, similar results were obtained on other resins, all results being tabulated as follows:

|  | Percent |
| --- | --- |
| Acrysol CQ | 84 |
| Separan C | 85.7 |
| Acrysol CA | 88 |
| Polyethylene imine | 91 |

The effect of various resins on reducing the blood level of cholesterol was tested in vivo. The results are given in Examples 2 to 4.

EXAMPLE 2

Male Kerr white leghorn chickens, all nine weeks old, and weighing between 800 g. and 1,000 g., with an average weight of about 900 g., were divided into groups of 10 birds each. One group served as a test group, and the other two groups were used as control groups. All three groups received atherogenic diet having the following composition in percentage by weight:

|  | Percent |
| --- | --- |
| Yellow corn meal | 46.3 |
| Soybean meal | 30.0 |
| Fish meal | 10.0 |
| Cottonseed oil | 5.0 |
| Cholesterol | 2.0 |
| Alfalfa meal | 2.0 |
| Steamed bone meal | 2.0 |
| Ground limestone | 1.5 |
| Sodium chloride | 0.5 |
| Choline chloride | 0.1 |
| Manganese sulfate | 0.02 |
| Inositol | 0.05 |
| Vitamin supplements and inerts | Balance |

NOTE.—The vitamin supplements included the following in the amounts indicated per 100 grams of feed:

| p-Aminobenzoic acid | mg | 15.0 |
| --- | --- | --- |
| Niacin | mg | 2.0 |
| Calcium pantothenate | mg | 1.5 |
| Pyridoxine | mg | 0.5 |
| Riboflavin | mg | 0.5 |
| Thiamine | mg | 0.25 |
| Vitamin A | units | 4000 |
| Vitamin D | units | 750 |
| Menadione | mcg | 50.0 |
| Biotin | mcg | 12.5 |
| Vitamin B$_{12}$ | mcg | 5.0 |

The test group also received 1% by weight (based on the weight of diet) of "Acrysol CQ" in the chloride form mixed with the diet. The other two groups served as controls. Blood plasma cholesterol concentrations at the end of four tests were found to be as follows:

|  | mg./100 cc. |
| --- | --- |
| Test group 3 (Acrysol CQ) | 193 |
| Control Group A | 324 |
| Control Group B | 270 |

EXAMPLE 3

The procedure of Example 2 was repeated except that "Separan C" (1% by weight based on the weight of diet) was administered to the test group. Blood plasma cholesterol concentrations were as follows:

|  | mg./100 cc. |
| --- | --- |
| Test group 4 (Separan C) | 180 |
| Control group C | 249 |
| Control group D | 244 |

EXAMPLE 4

Male Kerr white leghorn chickens, all nine weeks old and divided into groups of ten birds each, were given a basal diet having the following composition:

|  | Percent |
| --- | --- |
| Yellow corn meal | 53.3 |
| Soybean meal | 30.0 |
| Fish meal | 10.0 |
| Alfalfa meal | 2.0 |
| Steamed bone meal | 2.0 |
| Ground limestone | 1.5 |
| Sodium chloride | 0.5 |
| Choline chloride dry mix (25% choline chloride) | 0.4 |
| Manganese sulfate | 0.02 |
| Inositol | 0.05 |
| Vitamin supplement [1] and inerts | 0.2 |

[1] Same as in atherogenic diet in Example 1.

It will be noted that the composition of the basal diet is the same as that of the atherogenic diet except for the replacement of cottonseed oil and cholesterol with cornmeal.

Two test groups received, in addition to the basal diet 1%, by weight (based on the weight of diet) of Acrysol CA and polyethyleneimine, respectively. The other two groups served as controls. Blood plasma cholesterol levels after four days were found to be as follows:

|  | Mg./100 cc. |
| --- | --- |
| Test group 7 (Acrysol CA) | 64 |
| Test group 8 (polyethyleneimine) | 63 |
| Control group E | 76 |
| Control group F | 69 |

The foregoing examples illustrate the substantial reduction of blood cholesterol level in chickens which is achieved by the administration of a glycocholic acid-binding polymer according to this invention. Similar results are attained in dogs as shown by the examples which follow.

EXAMPLE 5

An 83-day test on four dogs was carried out to determine the effectiveness of Acrysol CQ in lowering blood cholesterol. Dog 1 served as a control throughout the entire test. The other dogs underwent alternate control and test periods. A commercial canine diet was given to each dog throughout the test. This diet was supplemented with 75 ml. per day of Acrysol CQ during test periods.

The test periods of dogs 2, 3 and 4 were as follows: Dog 2, from day 36 to day 83, inclusive; dog 3, from day 6 to day 47, inclusive; dog 4, from day 6 to day 12, inclusive, and from day 26 to day 83, inclusive.

Dog 3 was sacrificed on day 48. Autopsy revealed no signs of toxicity.

The blood plasma cholesterol levels in mg. per 100 cc. (mg. percent) are given in the table following. In this table test periods for each dog are denoted by an asterisk following the blood cholesterol level; other times are control periods.

PLASMA TOTAL CHOLESTEROL, MG. PERCENT

| Day | Dog 1 | Dog 2 | Dog 3 | Dog 4 |
|---|---|---|---|---|
| 1 | 96 | 133 | 84 | 79 |
| 2 | 95 | 127 | 82 | 74 |
| 5 | 107 | 134 | 83 | 73 |
| 6 | 100 | 111 | *75 | *65 |
| 7 | 103 | 110 | *63 | *56 |
| 8 | 91 | 104 | *54 | *50 |
| 9 | 113 | 121 | *56 | *53 |
| 12 | 98 | 111 | *47 | *42 |
| 13 | 103 | 111 | *41 | 49 |
| 14 | 96 | 114 | *36 | 43 |
| 15 | 102 | 119 | *35 | 62 |
| 16 | 98 | 113 | *39 | 60 |
| 19 | 95 | 124 | *43 | 69 |
| 20 | 93 | 119 | *46 | 72 |
| 22 | 97 | 121 | *41 | 72 |
| 23 | 93 | 118 | *41 | 71 |
| 26 | 94 | 115 | *42 | *60 |
| 29 | 95 | 117 | *46 | *49 |
| 33 | 90 | 109 | *49 | *48 |
| 36 | 93 | *63 | *49 | *51 |
| 37 | 86 | *59 | *49 | *56 |
| 40 | 95 | *60 | *53 | *54 |
| 43 | 86 | *74 | *49 | *54 |
| 47 | 90 | *75 | *62 | *62 |
| 50 | 98 | *81 | Sac. | *56 |
| 54 | 89 | *82 | | *56 |
| 57 | 91 | *76 | | *54 |
| 61 | 93 | *82 | | *63 |
| 64 | 95 | *84 | | *57 |
| 68 | 89 | *83 | | *63 |
| 71 | 92 | *80 | | *63 |
| 76 | 86 | *81 | | *63 |
| 83 | 90 | *88 | | *61 |

*Indicates test period.

EXAMPLE 6

Patients suffering from jaundice, severe pruritis and high serum bile acid concentrations (15 to 36 μg. per ml.) and in whom the cause of such biliary stasis is not a blockage of flow in the bile duct, are given 10 g. of polyethyleneimine per day, in solution. Pruritis ceases in each patient and serum bile acid concentrations drop to about 4 μg. per ml. Cessation of the resin administration causes resumption of the pruritis.

EXAMPLE 7

The following is an example of a 900 calorie therapeutic diet for treatment of hypercholesteremia:

| | |
|---|---|
| Acrysol CQ _____g__ | 10.0 |
| Corn oil _____g__ | 20.0 |
| Amorphous silica _____g__ | 2.5 |
| Non-fat dry milk solids _____g__ | 150.0 |
| Dry malt _____g__ | 5.0 |
| Sugar powder containing 3% starch ____g__ | 19.8 |
| Sodium cyclamate _____g__ | 0.47 |
| Sodium saccharin _____g__ | 0.12 |
| Cocoa _____g__ | 24.0 |
| Vanillin _____g__ | 0.1 |
| Methylcellulose _____g__ | 2.0 |
| Vitamin A palmitate _____mg_ | 15.0 |
| Vitamin $D_2$ _____mg_ | 0.025 |
| Ascorbic acid _____mg_ | 82.5 |
| Thiamine hydrochloride _____mg_ | 1.98 |
| Riboflavin _____mg_ | 0.24 |
| Pyridoxine hydrochloride _____mg_ | 2.48 |
| Cyanocobalamin (0.1% triturated in calcium dibasicphosphate) _____mg_ | 5.5 |
| Nicotinamide _____mg_ | 11.0 |
| Calcium pantothenate _____mg_ | 11.0 |
| Ferrous lactate _____mg_ | 36.0 |
| Manganous sulfate tetrahydrate _____mg_ | 7.5 |
| Zinc sulfate heptahydrate _____mg_ | 22.0 |
| Total _____g__ | 234.2 |

The mixture is prepared as follows. The vitamins and minerals are thoroughly mixed. The milk solids, malt, sugar, sodium cyclamate, saccharin, methylcellulose and cocoa are separately mixed. The vanillin is dissolved in 500 cc. of alcohol and added to the latter mixture, followed by rinsing the container with 250 cc. more alcohol. The vitamin-mineral mixture is then added and all are thoroughly mixed and comminuted. The therapeutic resin and the corn oil are mixed. The slurry is stirred while the silica is added. The slurry is then added to the powdered mixture previously prepared, comminuted air dried, and stored in air-tight containers.

EXAMPLE 8

The following is an example of a 100 calorie maintenance dose for treatment of hypercholesteremia.

| | G. |
|---|---|
| Non-fat dry milk solids _____ | 60 |
| Acrysol CQ _____ | 13.5 |
| Methylcellulose _____ | 1.0 |
| Sucrose _____ | 9.40 |
| Sodium cyclamate _____ | 0.10 |
| Cocoa _____ | 5.00 |
| Vitamin-mineral mixture _____ | 2.0 |
| Dry malt _____ | 5.0 |
| Total _____ | 96.0 |

The vitamin-mineral mixture is the same vitamin-mineral mixture shown in Example 7 from Vitamin A down, used in the same proportions. The composition is prepared by the same procedure as in Example 7, omitting the ingredients used there but not called for in the above formula.

EXAMPLE 9

The following is an example of a zero calorie oral composition for use in treating pruritis:

| | |
|---|---|
| Resin #2 from Example 6, dry (adjust actual usage to give this amount real) _____g__ | 10.0 |
| Cerelose _____g__ | 0.78 |
| Artificial flavoring _____cc__ | .003 |
| Alcohol as needed _____ | ---- |
| Total _____g__ | 10.783 |

The flavoring is dissolved in alcohol and added to the cerelose, the container being rinsed with more alcohol as needed. The resin #2, carboxyvinyl polymer, and sodium alginate are mixed and the flavored cerelose is added. The mixture is then comminuted, air dried, and stored in air-tight packets of 4.0 g. each.

What is claimed is:

1. A composition for binding bile acids in vivo into a non-absorbable form, comprising, in unit dosage form, from 0.1 to 250 mg. of a nontoxic polymer which is a water-soluble polymeric amine selected from the group consisting of,
   (a) poly acrylic acid esterified by sufficient of a quaternary ammonium substituted alcohol to give an equivalent weight, based on the quaternary ammonium groups, of less than 500,
   (b) poly acrylic acid esterified by sufficient of a tertiary amine substituted alcohol to give an equivalent weight, based on the tertiary amine groups, of less than 500,
   (c) polyethylene imine,
   (d) the copolymer of 30 parts by weight of acrylamide and 70 parts by weight vinyl benzyl trimethyl ammonium chloride,
   (e) polystyrene substituted in the phenyl groups with sufficient number of quaternary ammonium methyl groups to give an equivalent weight, based on the ammonium groups, of less than 500,
   (f) poly acrylamide in which sufficient of the amide side chains have been converted to quaternary ammonium alkyl ester groups to give an equivalent weight, based on the ammonium groups, of less than 500,
   (g) poly acrylonitrile in which sufficient of the nitrile side chain groups have been converted to quaternary ammonium alkyl ester groups to give an equivalent weight, based on the ammonium groups, or less than 500, said polymer being further characterized by,
(1) a molecular weight of at least 1500,
(2) the property of binding at least 80% of an equal weight of glycocholic acid in vitro into a form incapable of dialysis through a cellophane membrane, and
(3) a polymeric skeleton inert to degradation by digestive enzymes, and an orally ingestible carrier, said carirer being a balanced synthetic diet for human consumption, of controlled caloric content.

2. The composition of claim 1 in which the said polymer is poly acrylic acid esterified by sufficient of a quaternary ammonium substituted alcohol to give an equivalent weight, based on the quaternary ammonium groups, of less than 500.

3. The composition of claim 1 in which the said polymer is poly acrylic acid esterified by sufficient of a tertiary amine substituted alcohol to give an equivalent weight, based on the tertiary amine groups, of less than 500.

4. The composition of claim 1 in which the said polymer is the copolymer of 30 parts by weight of acrylamide and 70 parts by weight vinyl benzyl trimethyl ammonium chloride.

5. The composition of claim 1 in which the said polymer is polystyrene substituted in the phenyl groups with sufficient number of quaternary ammonium methyl groups to give an equivalent weight, based on the ammonium groups, of less than 500.

6. The method of binding bile acids in vivo into a form incapable of absorption by the intestinal wall which comprises administering orally to a human a nontoxic polymer which is a water-soluble polymeric amine selected from the group consisting of
(a) poly acrylic acid esterified by sufficient of a quaternary ammonium substituted alcohol to give an equivalent weight, based on the quaternary ammonium groups, of less than 500,
(b) poly acrylic acid esterified by sufficient of a tertiary amine substituted alcohol to give an equivalent weight, based on the tertiary amine groups, of less than 500,
(c) polyethylene imine,
(d) the copolymer of 30 parts by weight of acrylamide and 70 parts by weight vinyl benzyl trimethyl ammonium chloride,
(e) polystyrene substituted in the phenyl groups with sufficient number of quaternary ammonium methyl groups to give an equivalent weight, based on the ammonium groups, of less than 500,
(f) poly acrylamide in which sufficient of the amide side chains have been converted to quaternary ammonium alkyl ester groups to give an equivalent weight, based on the ammonium groups, of less than 500.
(g) poly acrylonitrile in which sufficient of the nitrile side chain groups have been converted to quaternary ammonium alkyl ester groups to give an equivalent weight, based on the ammonium groups, of less than 500, said polymer being further characterized by,
(1) a molecular weight of at least 1500,
(2) the property of binding at least 80% of an equal weight of glycocholic acid in vitro into a form incapable of dialysis through a cellophane membrane, and
(3) a polymeric skeleton inert to degradation by digestive enzymes, and an orally ingestible carrier, said carrier being a balanced synthetic diet for human consumption of controlled caloric content.

7. The method of claim 6 in which the said polymer is poly acrylic acid esterified by sufficient of a quaternary ammonium substituted alcohol to give an equivalent weight, based on the quaternary ammonium groups, of less than 500.

8. The method of claim 6 in which the said polymer is polyacrylic acid esterified by sufficient of a tertiary amine substituted alcohol to give an equivalent weight, based on the tertiary amine groups, of less than 500.

9. The method of claim 6 in which the said polymer is the copolymer of 30 parts by weight of acrylamide and 70 parts by weight vinyl benzyl trimethyl ammonium chloride.

10. The method of claim 6 in which the said polymer is polystyrene substituted in the phenyl groups with sufficient number of quaternary ammonium methyl groups to give an equivalent weight, based on the ammonium groups, of less than 500.

11. The method of lowering cholesterol blood level in a hypercholesterolemic patient which comprises administering orally from 0.1 to 1250 g. of a non-toxic polymer which is a water-soluble polymeric amine selected from the group consisting of,
(a) polyacrylic acid esterified by sufficient of a quaternary ammonium substituted alcohol to give an equivalent weight, based on the quaternary ammonium groups, of less than 500,
(b) polyacrylic acid esterified by sufficient of a tertiary amine substituted alcohol to give an equivalent weight, based on the tertiary amine groups, of less than 500,
(c) polyethyleneimine,
(d) the copolymer of 30 parts by weight of acrylamide and 70 parts by weight vinyl benzyl trimethyl ammonium chloride,
(e) polystyrene substituted in the phenyl groups with sufficient number of quaternary ammonium methyl groups to give an equivalent weight, based on the ammonium groups, of less than 500,
(f) polyacrylamide in which sufficient of the amide side chains have been converted to quaternary ammonium alkyl ester groups to give an equivalent weight, based on the ammonium groups, of less than 500,
(g) polyacrylonitrile in which sufficient of the nitrile side chain groups have been converted to quaternary ammonium alkyl ester groups to give an equivalent weight, based on the ammonium groups, of less than 500, said polymer being further characterized by,
(1) a molecular weight of at least 1500,
(2) the property of binding at least 80% of an equal weight of glycocholic acid in vitro into a form incapable of dialysis through a cellophane membrane, and
(3) a polymeric skeleton inert to degradation by digestive enzymes, and an orally ingestible carrier, said carrier being a balanced synthetic diet for human consumption of controlled caloric content.

12. The method of claim 11 in which said polymer is polyacrylic acid esterified by sufficient of a quaternary ammonium substituted alcohol to give an equivalent weight, based on the quaternary ammonium groups, of less than 500.

13. The method of claim 11 in which said polymer is polyacrylic acid esterified by sufficient of a tertiary amine substituted alcohol to give an equivalent weight, based on the tertiary amine groups, of less than 500.

14. The method of claim 11 in which said polymer is the copolymer of 30 parts by weight of acrylamide and 70 parts by weight vinyl benzyl trimethyl ammonium chloride.

15. The method of claim 11 in which said polymer is polystyrene substituted in the phenyl groups with sufficient number of quaternary ammonium methyl groups to give an equivalent weight, based on the ammonium groups, of less than 500.

16. The compositions of claim 1 in which the said polymer is polyethyleneimine.

17. The method of claim 6 in which the polymer is polyethyleneimine.

18. The method of claim 11 in which the polymer is polyethyleneimine.

References Cited by the Examiner

UNITED STATES PATENTS

| | | | |
|---|---|---|---|
| 2,381,020 | 7/1945 | Wilkes | 117—139.5 |
| 2,887,116 | 5/1959 | Wooding | 167—85 X |

FOREIGN PATENTS 802,346  7/1949  Germany.

OTHER REFERENCES

Tennent et al., "Journal of Lipid Research," vol. 1, No. 5, October 1960, pp. 469–473.

ALBERT T. MEYERS, *Primary Examiner.*

M. O. WOLK, JULIAN S. LEVITT, *Examiners.*

A. P. FAGELSON, G. A. MENTIS, *Assistant Examiners.*